United States Patent Office 2,865,904
Patented Dec. 23, 1958

2,865,904
ETHYLENE POLYMERISATION

Leslie Seed and Andrzej Pajaczkowski, Northwich, England, assignors to Imperial Chemical Industries Limited, London, England, a corporation of Great Britain No Drawing. Application February 28, 1956
Serial No. 568,174

Claims priority, application Great Britain
November 30, 1955

7 Claims. (Cl. 260—94.9)

This invention relates to improvements in processes for the polymerisation of ethylene to yield solid or semi-solid polymers and particularly to new catalysts for the polymerisation process at high pressures.

It is known that ethylene can be polymerised at moderately elevated temperatures, for example in the range 100°–300° C., and at high pressures of the order of 1000 atmospheres and more, without a catalyst to give solid polymers. It is also known that certain catalysts profoundly affect the course of the polymerisation reaction and increase the rate of polymerisation. Among such catalysts are oxygen and several types of peroxy compounds, for example alkyl and aryl peroxides, inorganic per-salts and esters of inorganic per-acids. Particularly useful catalysts among the peroxy compounds are diperoxides derived from carboxylic acids, for example dipropionyl, dilauroyl and dibenzoyl peroxides, but to achieve useful rates the polymerisation process has to be carried out at temperatures above about 80° C. and, for some of these catalysts, at substantially higher temperatures.

If the high-pressure polymerisation of ethylene could be carried out at lower temperatures than have so far been found practicable, there are grounds for believing that the polymers obtained would be denser and stiffer and so have improved properties in those respects.

It is an object of the present invention to provide a process in which the high pressure polymerisation of ethylene at useful rates can be carried out if desired in the range from room temperature up to about 50° C. It is a further object to provide catalysts for such a process. It is yet another object to provide by the process solid polymers of ethylene that are denser and stiffer than those hitherto made by high-pressure polymerisation processes.

We have found that by the use as catalysts of acyl peroxides that carry substituents on the α-carbon atoms it is possible to carry out the high-pressure polymerisation of ethylene at temperatures below 50° C., and at useful rates, to obtain solid polymers that are denser and stiffer and have a higher degree of crystallinity than the polymers obtained in the known processes carried out at temperatures above 80° C. In general we have found that for a given useful rate of reaction the α-substituted acyl peroxides enable the high-pressure polymerisation of ethylene to be carried on at temperatures some 40 to 50 centigrade degrees below those at which known catalysts are used. Alternatively, at a given reaction temperature above 80° C. the α-substituted acyl peroxides enable the polymerisation to proceed at much higher rates than are possible with known catalysts.

According to our invention a process for the polymerisation of ethylene at superatmospheric pressure to yield solid polymers therefrom is characterised in that α-substituted acyl peroxides are used as catalysts.

In one form of our invention the polymerisation process is carried out at temperatures within the range 10°–50° C. and at pressures above 500 atmospheres.

The α-substituted acyl peroxides used in the process of our invention possess the general formula

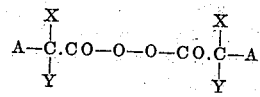

where X and Y are groups other than hydrogen, for example alkyl, alkoxy, aryl or halogen groups, and where X may equal Y, and where A may be hydrogen. If A be not hydrogen it may equal X or Y or it may be dissimilar to them. Examples of such peroxides are di-Isobutyryl peroxide
di-Pivalyl peroxide (bis-tri-methyl acetyl peroxide)
bis-α-Dichloroisobutyryl peroxide
bis-Trichloracetyl peroxide
bis-α-Methoxy isobutyryl peroxide
bis-β-Methoxy isobutyryl peroxide.

A very suitable combination for yielding dense, stiff polythenes is di-pivalyl peroxide as catalyst in a proportion of 5–30 parts per million of ethylene, a temperature within the range 20–35° C. and a pressure within the range 1250–1500 atmospheres. Di-isobutyryl peroxide is also a suitable catalyst at somewhat higher temperatures for example 30–50° C. The maximum desirable operating pressure is of the order of 2000 atmospheres. All the catalysts may be used, if desired, at temperatures above 50° C., but the higher the temperature the less dense is the product.

The process of our invention may be operated batch-wise or continuously.

Interpolymers of ethylene with other unsaturated compounds for example carbon monoxide, vinyl acetate, vinyl carbazale, allyl acetate, may also be prepared by our process.

The α-substituted acyl peroxide catalysts of our process may if desired be activated by agents known to activate other peroxides, for example tertiary amines.

The invention is illustrated, but not restricted, by the following examples.

Example 1

Into a high-pressure reaction vessel cooled to below 0° C. was introduced 0.5 ml. of a solution containing 5.2 gm. diisobutyryl peroxide in 100 ml. pentane. The vessel was closed and the air contained therein was removed by purging repeatedly with ethylene. Ethylene was admitted to a pressure of 1600 atmospheres, the vessel being simultaneously warmed up to, and maintained at, a temperature of 50° C. After the pressure of contained ethylene had fallen by 100 atmospheres in 20 minutes, the vessel was reopened and it was found that 5.0 gm. of a solid white polyethylene had been produced. The material after solution in hot xylene, filtration from contaminating solids, and precipitation with methanol had, after drying, a number-average molecular weight, as calculated from the melt viscosity (for example as in J. Pol. Sci. 8 353 (1952)) of 37,500 and a density of 0.9524 gm./cc. A polyethylene of this molecular weight made at the same rate with benzoyl peroxide required a temperature of 110° C. and had a density of 0.939 gm./cc., whilst at 50° C. the rate of reaction with benzoyl peroxide as catalyst is negligibly slow.

Example 2

0.35 ml. of a solution containing 3.6 gm. di-pivalyl peroxide in 100 ml. pentane was introduced into a high-pressure reaction vessel cooled to below 0° C. After sweeping out the enclosed air, ethylene was admitted up to a pressure of 1000 atmospheres and the vessel was thenceforth maintained at a temperature of 20° C. During the following 51 minutes the pressure of ethylene in the vessel fell by 100 atmospheres. The vessel was then opened and found to contain 4.2 gm. of a solid white polyethylene. The product, treated as in Example 1, had a number-average molecular weight of 77,000 and a density of 0.942 gm./cc. By comparison, when dilauroyl peroxide was used as catalyst a temperature of 85° C. was required to obtain a similar rate of polymerisation at 1400 atmospheres. The product, although it had a molecular weight similar to the foregoing example, had a density of only 0.934 gm./cc. whilst at 20° C. the rate of reaction with dilauroyl peroxide as catalyst is negligible.

What we claim is:

1. Process for the manufacture of solid polymers of ethylene which comprises subjecting gaseous ethylene to a pressure greater than 500 atmospheres and a temperature between 10° C. and 50° C., in the presence of an α-substituted acyl peroxide catalyst selected from the group consisting of di-isobutyryl peroxide, di-pivalyl peroxide, bis-α-methoxy isobutyryl peroxide, and bis-β-methoxy isobutyryl peroxide.

2. Process as claim in claim 1 in which the pressure is between 1000 and 2000 atmospheres and the temperature between 10° and 50° C.

3. Process as claimed in claim 2 in which the catalyst is di-pivalyl peroxide.

4. Process as claimed in claim 2 in which the catalyst is di-isobutyryl peroxide.

5. Process as claimed in claim 1 in which the catalyst is di-pivalyl peroxide in a proportion of 5 to 30 parts per million of ethylene, the temperature is within the range 20 to 35° C., and the pressure is within the range 1250–1500 atmospheres.

6. Process as claimed in claim 2 in which the catalyst is bis-α-methoxy isobutyryl peroxide.

7. Process as claimed in claim 2 in which the catalyst is bis-β-methoxy isobutyryl peroxide.

References Cited in the file of this patent

UNITED STATES PATENTS

| | | |
|---|---|---|
| 2,559,630 | Bullitt | July 10, 1951 |
| 2,728,756 | Friedlander | Dec. 27, 1955 |

OTHER REFERENCES

Cooper: J. Chem. Soc. (November 1951), 3106–3113. (Library.)